United States Patent

[11] 3,555,170

[72] Inventor Aristovoulos George Petzetakis
Thessalonikis & Chandri St., Moschaton, Piraeus, Greece
[21] Appl. No. 735,639
[22] Filed June 10, 1968
[45] Patented Jan. 12, 1971
[32] Priority June 24, 1967
[33] Greece
[31] No. 35,261

[54] FLEXIBLE HOSE INCORPORATING EXTENSIBLE CONDUCTIVE TAPE
5 Claims, 6 Drawing Figs.
[52] U.S. Cl. .................................... 174/47, 174/69, 174/117; 317/2
[51] Int. Cl. ..................................... H05f 3/00, F16l 11/12
[50] Field of Search ............................ 174/47, 69, 117.2; 317/2; 340/320; 138/103

[56] References Cited
UNITED STATES PATENTS

| | | | |
|---|---|---|---|
| 646,886 | 4/1900 | Stowe et al. ................. | 174/47 |
| 837,512 | 12/1906 | Seeley .......................... | 174/47 |
| 1,223,864 | 4/1917 | French .......................... | 174/47UX |
| 2,200,967 | 5/1940 | Phillips .......................... | 174/47UX |
| 2,320,367 | 6/1943 | Leathers ....................... | 174/47 |
| 3,042,737 | 7/1962 | Brumback et al............. | 174/47 |
| 3,367,370 | 2/1968 | Sherlock ....................... | 174/47UX |

FOREIGN PATENTS

| | | | |
|---|---|---|---|
| 750,824 | 6/1933 | France ......................... | 174/69 |
| 1,183,626 | 1/1959 | France ......................... | 174/69 |
| 813,151 | 5/1959 | Great Britain................ | 174/47 |

Primary Examiner—Laramie E. Askin
Attorney—Cushman, Darby & Cushman

ABSTRACT: A flexible hose having a conductor element extending along the hose wall. The conductor element is in the form of an elastic conductive strip or tape having a generally flat configuration and formed of elastic yarns or threads extending along the strip or tape and flexible metal wires or threads of metal braided, plaited or interwoven with the elastic yarns or threads. The conductive element being of this form is of use especially for extruded hoses, since it can be laid along the hose parallel to the hose axis and will stretch to accommodate hose elongation.

PATENTED JAN 12 1971
3,555,170
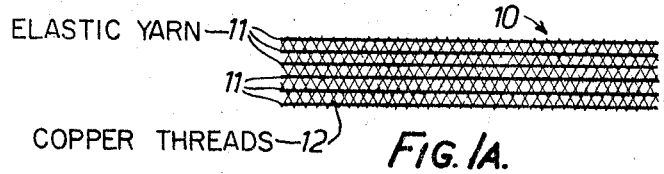
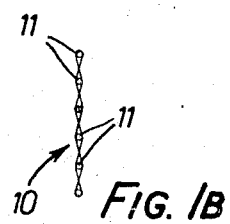
Fig. 1A.
Fig. 1B.
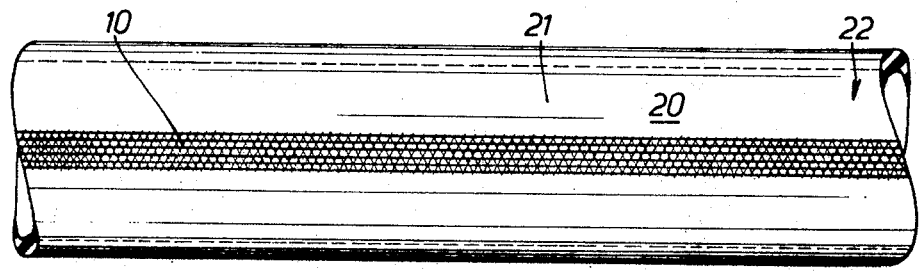
Fig. 2.
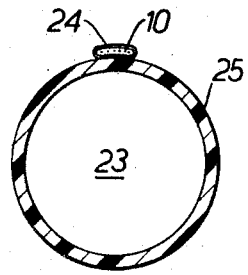
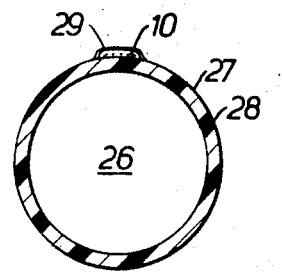
Fig. 3.
Fig. 4.
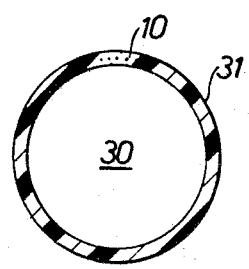
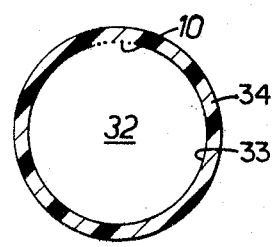
Fig. 5.
Fig. 6.
INVENTOR
Aristovoulos George Petzetakis
BY
Cushman, Darby & Cushman
ATTORNEY

FLEXIBLE HOSE INCORPORATING EXTENSIBLE CONDUCTIVE TAPE

The present invention relates to hoses, and more particularly to hoses incorporating conductors to avoid or lessen the risk of excessive static electrical charges in the hoses.

It is known that there is a tendency for the conveyance of certain substances, such as inflammable fuels, grain or pulverized material, through flexible hoses of electrically insulating material to induce static electrical charges in the hoses.

It is also known for flexible hoses of rubber material which are to convey such materials each to incorporate a metallic conductor wire extending helically along the wall of the hose, the conductor wire lying either on the inner or outer surface of the hose wall or in the hose wall. The conductor wire is able to conform to bending and/or elongation of the hose by reason of the helical configuration of the conductor wire.

Such a hose is usually made by superimposing layers of rubber, textile material and the helical wire. It is relatively difficult and/or expensive to incorporate a helical conductor wire in a hose produced by extrusion.

It is an object of the invention to provide an alternative form of conductive element for incorporation in a flexible hose.

It is envisaged that an important application of the invention will be to hoses of which the hose walls are produced by extrusion, but the invention may have other applications.

According to the invention there is provided a flexible hose having a conductor element extending along the hose wall, the conductor element being in the form of an elastic conductive strip or tape, the strip or tape being generally of flat configuration and formed of elastic yarns or threads extending along the strip or tape and flexible metal wires or threads of metal braided, plaited or interwoven with the elastic yarns or threads.

The invention will be described by way of examples with reference to the accompanying drawings, wherein:

FIGS. 1A and 1B are a side view and an end view respectively of a conductor element in the form of an elastic conductive tape, to extend along a hose wall in accordance with the invention;

FIG. 2 is a side elevation of a small length of hose incorporating the tape of FIG. 1 in accordance with the invention;

FIG. 3 is a cross section through another hose in accordance with the invention;

FIG. 4 is a cross section through another hose in accordance with the invention;

FIG. 5 is a cross section through another hose in accordance with the invention; and FIG. 6 is a cross section through a fifth hose in accordance with the invention.

Referring to FIGS. 1A and 1B, there is shown an elastic tape 10 consisting of parallel extremely fine elastic yarns 11, preferably but not necessarily of thermoplastic polyurethane, on which very fine metallic wires 12, of copper, have been braided at such an angle, determined empirically, as to permit elastic elongation of the tape 10 and eventual restoration of the tape 10 to its original length.

The tape 10 may be made by means of an ordinary braiding machine as is commonly used for making elastic fabric belts, with the exception that copper wires are used instead of fibre yarns, so that the tape 10 shall be electrically conductive.

The hose 20 shown in FIG. 2 comprises a hose wall 21 preferably, but not necessarily, made by extrusion, and the tape 10 extending along the hose wall 21 parallel to the axis of the hose 20, in the external surface 22 of the hose wall 21. The materials of the hose wall 21 and the elastic yarns 11 are, for this purpose, preferably compatible with each other.

The tape 10 and its incorporation thus in the hose 20 provides three characteristics. Firstly, the tape 10, being elastic, is able to conform to any bending and elongation of the hose 20. Secondly, being generally flat, it does not damage the hose wall 21 or reduce the strain resistance of the hose wall 21. Thirdly, it takes up little space.

The tape 10 can be incorporated in the hose 20 during extrusion of the hose wall 21, without much difficulty.

Fig. 3 shows a modified hose 23 similar to the hose 20 that the tape 10 is coated with a protective covering 24 of a plastics material which is compatible with the hose wall 25 and which is fused to the hose wall 25.

The hose 23 may be made in a similar manner to the hose 20. Alternatively, by reason of the provision of the plastics covering 24 the tape 10 and the covering 24 may both be applied to the hose wall 25 after the hose wall 25 has already been formed.

As will be seen from FIG. 3, the covering 24 completely envelopes the tape 10, and it is envisaged that the covering 24 will be already on the tape 10 when the tape is applied to the hose wall 25.

FIG. 4 shows a modified hose 26 with tape 10 incorporated in the external surface 27 of the hose wall 28 and with a covering 29, of plastics material compatible with the material of the hose wall 28, fused to the hose wall 28. In this case, the covering 29 is over only the outside of tape 10.

FIG. 5 shows a modified hose 30 in which tape 10 is embedded within the hose wall 31. In this case in particular, it is highly desirable that the elastic yarns 11 (FIGS. 1A and 1B) and the hose wall 31 should be of mutually compatible materials.

FIG. 6 shows a further modified hose 32 in which the tape 10 is incorporated in the inner surface 33 of the hose wall 34. In this case also, the yarns 11 (FIGS. 1A and 1B) and the hose wall 34 should be of mutually compatible materials.

Tape 10 may have a wider or looser braiding, that is to say, so that there are distinct gaps between the braided wires.

By incorporating the tape 10 in the hoses 20, 26, 30 and 32 during production of the hose walls 21, 28, 31 and 34 by extrusion, while the hose walls are still not set, the materials of the hose may be made to fill up the interstices of the tape 10, particularly if the yarns 11 are of compatible materials.

In use, the tape 10 is earthed so as to conduct electrostatic charges away to prevent or reduce the risk of fire or explosion, and generally to increase the safety of the environment in which the hose is used.

I claim:

1. A flexible hose of a thermoplastic material, the wall of said hose including an extensible conductive tape having a generally flat configuration and extending parallel to the hose axis, said extensible conductive tape comprising extremely fine elastic yarns of a material compatible with the thermoplastic hose wall material extending longitudinally of said tape and braided with very fine metal threads to define a plurality of interstices, and the thermoplastic material of said hose wall filling the interstices of said extensive conductive tape.

2. A hose according to claim 1, wherein said tape is located adjacent the inner surface of said hose wall.

3. A hose according to claim 1, wherein said tape is located adjacent the outer surface of said hose wall.

4. A hose according to claim 1, wherein the material of said yarns is thermoplastic polyurethane.

5. A hose according to claim 1, wherein the metal of said threads is copper.